US009481252B1

(12) United States Patent
Si et al.

(10) Patent No.: US 9,481,252 B1
(45) Date of Patent: Nov. 1, 2016

(54) REGENERATIVE BRAKING SYSTEM FOR REDUCING FUEL CONSUMPTION

(71) Applicant: CATERPILLAR INC., Peoria, IL (US)

(72) Inventors: Baojun Si, Dunlap, IL (US); Dustin C. Selvey, Peoria, IL (US); William J. Tate, Dunlap, IL (US); Mary Jill Trumper, Sullivan, IL (US); Alexander Cameron Crosman, III, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/724,767

(22) Filed: May 28, 2015

(51) Int. Cl.
*H02P 3/14* (2006.01)
*B60L 7/20* (2006.01)
*H02P 27/04* (2016.01)
*B60L 7/06* (2006.01)

(52) U.S. Cl.
CPC .. *B60L 7/20* (2013.01); *B60L 7/06* (2013.01); *H02P 3/14* (2013.01); *H02P 27/04* (2013.01)

(58) Field of Classification Search
CPC ............ H02P 27/04; H02P 3/14; H02P 3/12; H02P 6/24; B60L 2200/26
USPC ................. 318/139, 400.01, 400.02, 400.14, 318/400.15, 700, 701, 727, 779, 799, 800, 318/801, 362, 369, 370, 371, 372, 373, 374, 318/375, 376, 430, 432, 437, 244, 269, 273, 318/805, 812; 363/40, 44, 95, 120, 174, 363/175; 388/800, 819, 821
See application file for complete search history.

(56) References Cited

U.S. PATENT DOCUMENTS

| 7,940,016 | B2 * | 5/2011 | Donnelly et al. ......... B60L 7/04 318/139 |
| 8,395,335 | B2 | 3/2013 | Marchand et al. |
| 8,857,542 | B2 | 10/2014 | Hendrickson et al. |

FOREIGN PATENT DOCUMENTS

CN 102055354 11/2013

* cited by examiner

*Primary Examiner* — Anthony M Paul
(74) *Attorney, Agent, or Firm* — Finnegan, Henderson, Farabow, Garrett & Dunner, LLP

(57) ABSTRACT

Systems and methods are disclosed for reducing engine fuel consumption during regenerative braking. According to certain embodiments, the regenerative braking system has an engine, a generator, a rectifier, a first inverter, a traction motor, and a reverse recovery unit. The generator is configured to be driven by the engine to produce AC electrical power. The rectifier is configured to receive AC electrical power from the generator and convert the AC power to DC power. The first inverter is configured to receive the DC power and convert the DC power to AC power. The traction motor is configured to be driven by the AC power in a traction mode, and to produce regenerated power when rotated in reverse in a regenerative braking mode. The reverse recovery unit has a second inverter and a filter. The second inverter is electrically connected in parallel with the rectifier and configured to communicate at least part of the regenerated power from the traction motor to the generator during the regenerative braking mode. The filter is electrically connected downstream of the second inverter and in parallel with the rectifier. The filter is configured to filter transient voltage generated by the second inverter during the regenerative braking mode.

20 Claims, 4 Drawing Sheets

REGENERATIVE BRAKING SYSTEM FOR REDUCING FUEL CONSUMPTION

TECHNICAL FIELD

The present disclosure relates generally to a regenerative braking system, and more particularly, to a regenerative braking system for reducing fuel consumption by an engine.

BACKGROUND

A typical electric drive system for a mobile machine, such as a mining truck, includes a prime mover to produce a mechanical output received by a generator. For example, the prime mover may be an internal combustion engine and the mechanical output may be a rotation of a crankshaft. The generator is driven by the mechanical output to produce an alternating current (AC) output. A first set of power electronics, such as rectifiers, may receive the AC output and convert the AC to a direct current (DC) output. The DC output is then passed through a second set of power electronics, such as inverters that convert the DC output to an AC output with a desired frequency. When the mobile machine is operating in a traction mode, this AC output is then used to drive one or more traction motors, which in turn drive one or more wheels and propel the mobile machine.

The mobile machine may also be capable of doing regenerative braking (e.g., braking, decelerating, downshifting, etc.). During regenerative braking, the traction motors function as generators by converting the kinetic energy of the mobile machine to electrical energy. The energy efficiency of the mobile machine may rely on how this regenerated electrical energy is treated. One way of treating the regenerated electrical energy is to dissipate it as heat through a retarding grid of resistors. To avoid overheating, a grid blower may be used to cool the retarding grid. Meanwhile, the engine still needs to consume fuel to power all parasitic loads and/or auxiliary devices during regenerative braking or idling of the mobile machine. Thus, in this way, the regenerated electrical energy is wasted without reducing any fuel consumption of the engine.

For fuel efficiency and environmental purposes, it is desirable to use the regenerated electrical energy to at least partially power the mobile machine and its subsystems. For example, the mobile machine may store the regenerated electrical energy in energy storage devices for later use. The stored energy may be used to power the parasitic load and/or auxiliary devices so as to reduce engine involvement and fuel consumption. A drawback of this arrangement is that the usually heavy energy storage devices add extra weight to the mobile machine and may increase fuel consumption in the traction mode.

Alternatively, the regenerated electrical energy may be used by the generator working as a motor to drive the engine. However, because the rectifiers only allow power flowing in a single direction, i.e., from AC to DC, additional power conversion units are needed to reversely communicate the regenerated electrical energy to the generator. One such solution is described in U.S. Pat. No. 7,034,480 (the '480 patent) issued to Kumar et al. on Apr. 25, 2006. The '480 patent discloses a drive system that feeds the regenerated electrical energy into a main alternator to rotate an engine. When the system is operating in a traction mode, the AC output by the main alternator is converted by a rectifier to DC power. The DC power is subsequently converted by multiple traction motor inverters to three-phase AC power provided to multiple traction motors. The system further includes a switch-type contactor and an additional inverter between the main alternator and the multiple traction motor invertors. The contactor is used to control the activation of the additional inverter. The additional converter and the rectifier are connected in a parallel configuration. When the system is working in a regenerative braking mode, AC power from the multiple traction motors is converted to DC power by the multiple traction motor inverters. The system then closes the contactor and thereby activates the additional inverter to convert the DC power into AC power to rotate the main alternator, such that the engine may produce power without fuel use.

Although the drive system of the '480 patent may provide an electrical pathway for using the regenerated electrical energy to power the engine, the system may lack electrical stability. In particular, the parallel-connected additional inverter can generate fast-changing transient voltage that may turn on the diodes in the rectifier, causing erroneous current circulation. Such current circulation not only causes power loss, but also leads to current distortion disturbing other sensitive loads and equipment in the drive system. In serious cases, the current distortion may cause voltage spikes, circuit overheating, damages to control system, etc. Moreover, the transient voltage may cause high voltage buildup at the slow-responding diodes of the rectifier. This high voltage may generate electrical arc that damages the diodes and/or the contactor.

The disclosed system is directed to overcoming one or more of the problems set forth above and/or other problems of the prior art.

SUMMARY OF THE INVENTION

In one aspect, the present disclosure is directed to a regenerative braking system including an engine, a generator, a rectifier, a first inverter, a traction motor, and a reverse recovery unit. The generator is configured to be driven by the engine to produce AC electrical power. The rectifier is configured to receive AC electrical power from the generator and convert the AC power to DC power. The first inverter is configured to receive the DC power and convert the DC power to AC power. The traction motor is configured to be driven by the AC power in a traction mode, and to produce regenerated power when rotated in reverse in a regenerative braking mode. The reverse recovery unit includes a second inverter and a filter. The second inverter is electrically connected in parallel with the rectifier and configured to communicate at least part of the regenerated power from the traction motor to the generator during the regenerative braking mode. The filter is electrically connected downstream of the second inverter and in parallel with the rectifier. The filter is configured to filter transient voltage generated by the second inverter during the regenerative braking mode.

In another aspect, the present disclosure is directed to a method for reducing fuel consumption of a machine during regenerative braking. The machine includes a generator, a rectifier, and a traction motor configured to produce regenerated power in a regenerative braking mode. The method includes directing at least part of the regenerated power from the traction motor to the generator through an inverter during the regenerative braking mode. The inverter is electrically connected in parallel with the rectifier. The method further includes directing electrical output of the inverter through a filter to remove transient voltage from the electrical output. The filter is electrically connected downstream of the inverter and in parallel with the rectifier.

In yet another aspect, the present disclosure is directed to a reverse recovery unit for a machine. The machine includes a generator, a rectifier, and a traction motor configured to produce regenerated power in a regenerative braking mode. The reverse recovery unit is used to communicate the regenerated power from the traction motor to the generator. The reverse recovery unit includes an inverter and a filter. The inverter is electrically connected in parallel with the rectifier and configured to communicate the regenerated power from the traction motor to the generator during the regenerative braking mode. The filter is electrically connected downstream of the inverter and in parallel with the rectifier. The filter is configured to filter transient voltage generated by the inverter during the regenerative braking mode.

DETAILED DESCRIPTION

Figure 1:
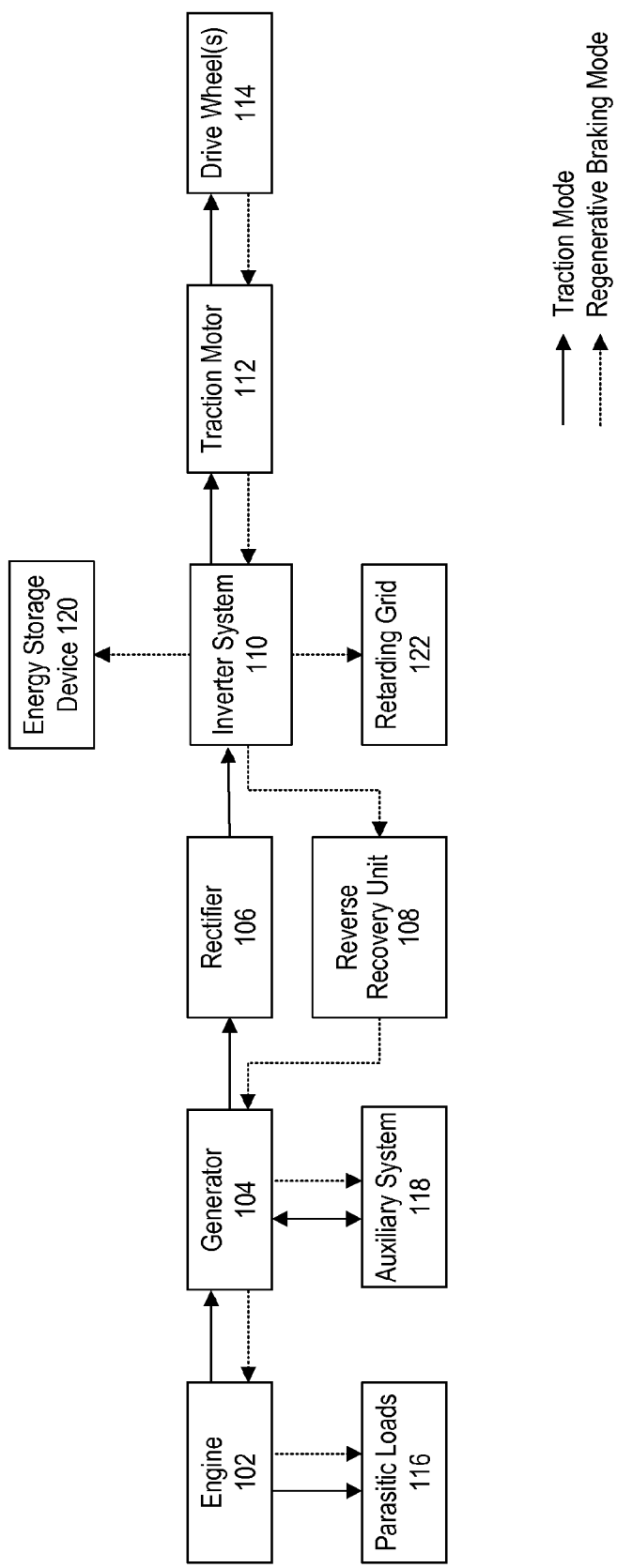
FIG. 1 is a block diagram illustrating an exemplary mobile machine including a regenerative braking system.

FIG. 1 schematically illustrates a mobile machine 100 including a regenerative braking system for reducing fuel consumption. The mobile machine 100 may include an engine 102, a generator 104, a rectifier 106, a reverse recovery unit 108, an inverter system 110, a traction motor 112, one or more drive wheels 114, parasitic loads 116, an auxiliary system 118, an energy storage device 120, a retarding grid 122.

Engine 102 may be an internal combustion engine and serve as the primary power source of machine 100. Engine 102 may be configured to provide direct or indirect power to parasitic loads 116 via belts, hydraulic systems, and the like. Engine 102 may also be mechanically coupled to generator 104 through a drivetrain that may include, for example, a crankshaft, a torque converter, a transmission, clutches, gears, and other drivetrain components. Generator 104 may be electrically connected to auxiliary system 118. Auxiliary system 118 may include one or more auxiliary devices and an auxiliary driver. The auxiliary devices may include, for example, a heating, ventilation, and air condition (HVAC) system, conditioning circuitry, a battery charging device, an electrically driven pump, and accessories. The auxiliary driver may be disposed between generator 104 and the auxiliary devices and include an auxiliary generator, a bidirectional inverter, or any other means for allowing bidirectional electrical communication therebetween. For example, generator 104 may operate as a motor to rotate the auxiliary generator to generate AC power supplied to the auxiliary devices. A DC output by an auxiliary device may also be supplied to generator 104 through the bidirectional inverter.

Rectifier 106 may be electrically connected to generator 104 and configured to convert the AC power generated by generator 104 to DC power outputted to inverter system 110. Inverter system 110 may be electrically connected to rectifier 106, reverse recovery unit 108, traction motor 112, energy storage device 120, and retarding grid 122. Inverter system 110 may include one or more inverters. Inverter system 110 may be configured to allow bidirectional power communication. That is, inverter system 110 may be configured to convert a DC input received from rectifier 106 to an AC output, and to convert an AC input received from traction motor 112 to a DC output. Inverter system 110 may include one or more circuits and/or sub-circuits to direct electrical power to and from rectifier 106, reverse recovery unit 108, traction motor 112, energy storage device 120, and retarding grid 122. Reverse recovery unit 108 may be electrically connected in parallel with rectifier 106 and configured to convert the DC power generated by inverter system 110 to AC power outputted to generator 104. For example, reverse recovery unit 108 may include an inverter. In combination, rectifier 106 and reverse recovery unit 110 allows bidirectional electrical power communication between generator 104 and traction motor 112.

Traction motor 112 may be mechanically coupled with one or more drive wheels through, for example, one or more drive shafts. Traction motor may be capable of operating in a traction mode and a regenerative braking mode. That is, in the traction mode, traction motor 112 may be operable to convert AC power from inverter system 110 to a torque that drives the rotation of one or more drive wheels 114. In the regenerative braking mode, traction motor 112 may operate as a generator and be rotated by one or more drive wheels 114 to produce AC output to inverter system 110.

During the traction mode, power may be transferred from engine 102 toward one or more drive wheels 114, as shown by the solid arrows in FIG. 1, to cause movement of the machine. Specifically, engine 102 may produce an output torque to generator 104, which may convert the mechanical torque into electrical power. The electrical power may be generated in the form of AC power. The AC power may then be converted to DC power by rectifier 106. The DC power may be further converted to an appropriate amount of AC power by inverter system 110. The resulting AC power may then be used to drive traction motor 112 to generate desired torque to rotate one or more drive wheels 114. Moreover, during the traction mode, the auxiliary driver may communicate part of the power generated by generator 104 to the auxiliary devices, and/or communicate some power supplied by the auxiliary devices to generator 104 so as to at least partially drive engine 102 and motor 112. In addition, engine 102 may produce mechanical output to drive parasitic loads 116.

During the regenerative braking mode, electrical power may be regenerated by the mechanical rotation at one or more drive wheels 114 and directed toward engine 102, as shown by the dashed arrows in FIG. 1. Specifically, the kinetic energy of the machine 100 may be converted into rotational power at one or more drive wheels 114. This rotational power may further rotate traction motor 112 to generate electrical power, for example, in the form of AC power. Inverter system 110 may convert the AC power into DC power.

Dissipation of the DC power may produce a counter-rotational torque at one or more drive wheels 114 to decelerate machine 100. Such dissipation may be accomplished in three ways. First, the DC power generated by inverter system 110 may be converted by reverse recovery unit 108 to AC power that rotates generator 104, which in turn mechanically rotates engine 102. Engine 102 may subsequently provide mechanical output to parasitic loads 116 via belts, hydraulic systems, and the like. Similarly, generator 104 may supply power to auxiliary system 118, for example, by rotating an auxiliary generator. This way, fuel consumption by engine 102 may be temporarily reduced during the regenerative braking mode. Second, the electrical current generated by inverter system 110 may be passed through retarding grid 122 including one or more resistors. Excess heat generated at retarding grid 122 may be expelled using a grid cooling system. Third, the electrical current generated by inverter system 110 may be directed to recharge energy storage device 120 so that the regenerated electrical power may be stored for future use.

Figure 2:
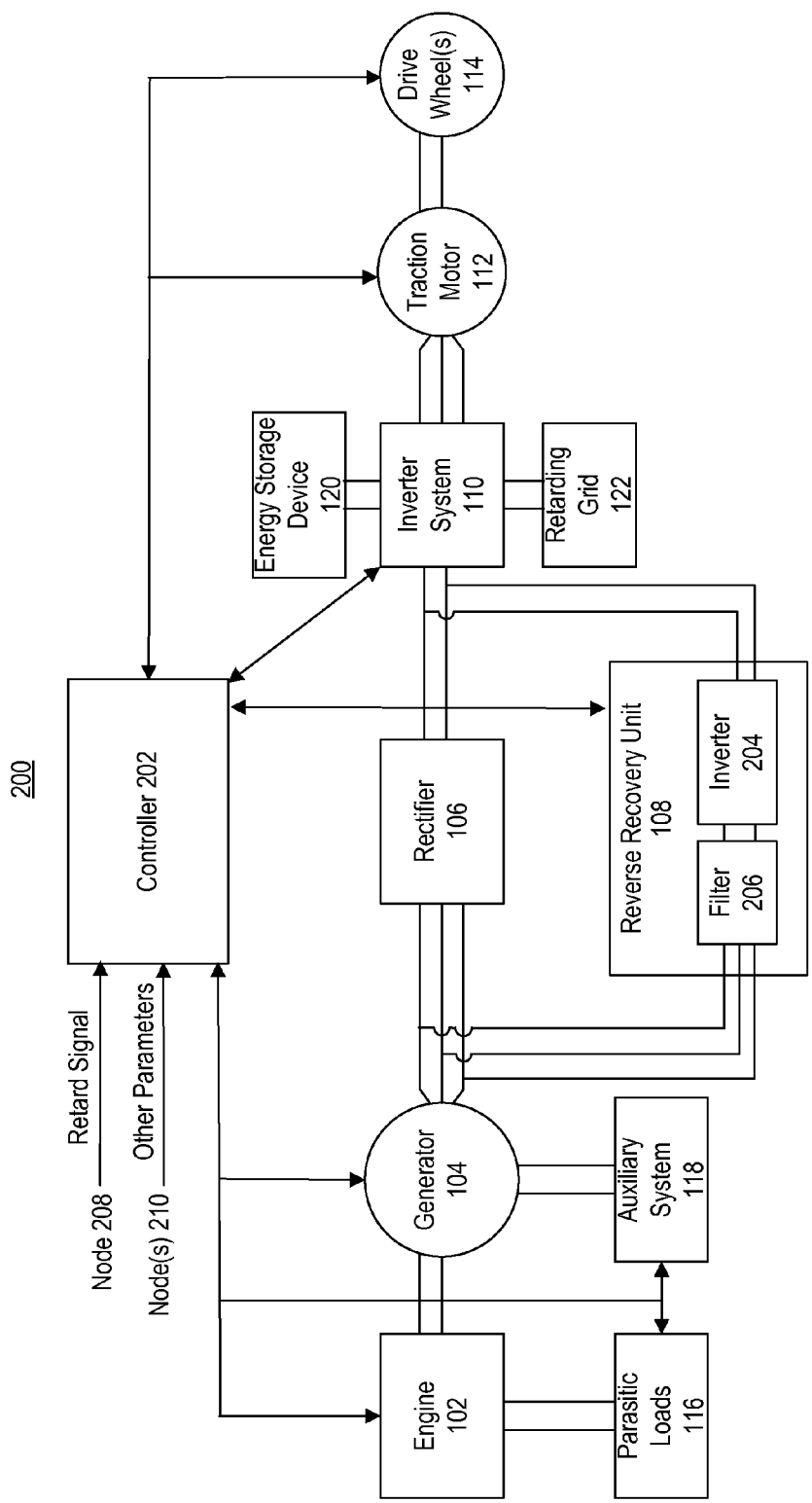
FIG. 2 is a schematic illustration of an exemplary regenerative braking system used by the mobile machine illustrated in FIG. 1.

FIG. 2 is a schematic illustration of an exemplary regenerative braking system 200 for using regenerated electrical power. Referring to FIG. 2, system 200 may include an engine 102, a generator 104, a reverse recovery unit 108, an inverter system 110, a traction motor 112, one or more drive wheels 114, an energy storage device 120, a retarding grid 122, and a controller 202. According to exemplary embodiments, system 200 may be incorporated into or used with mobile machine 100.

Traction motor 112 and one or more drive wheels 114 may serve as the primary power source during the regenerative braking mode. Each drive wheel 114 is mechanically coupled to motor 112 through, for example, a drive shaft. Rotation of one or more drive wheels 114 may turn traction motor 112 and cause motor 112 to generate AC power. Inverter system 110 may be configured to convert this AC power to DC power and direct the DC power to at least one of reverse recovery unit 108, energy storage device 120, and retarding grid 122.

Controller 202 may take many forms, including, for example, a computer based system, a microprocessor based system, a microcontroller, an electronic control module (ECM), an electronic control unit (ECU), or any other suitable control type circuit or system. Controller 202 may include various components for running software applications designed to control system 200. For example, controller 202 may include a processor, a memory, a storage device, an input/output (I/O) device. The processor may include one or more commercially available microprocessors, microcontrollers, digital signal processors (DSPs), and other similar devices that may be configured to perform the functions of the processor. The memory may include one or more devices configured to store information used by the processor to perform certain functions related to the disclosed embodiments. For example, the memory may store one or more power recovery programs loaded from the storage device or elsewhere that, when executed, enable controller 202 to allocate and direct the regenerated electrical power to at least one of reverse recovery unit 108, energy storage device 120, and retarding grid 122. The storage device may include a volatile or non-volatile, magnetic, semiconductor, tape, optical, removable, nonremovable, or other type of storage device or computer-readable medium. Controller 202 may also include one or more of an application-specific integrated circuit (ASIC), a field-programmable gate array (FPGA), a computer system, and a logic circuit, configured to allow controller 202 to function in accordance with the disclosed embodiments. Accordingly, the memory of controller 202 may include, for example, the flash memory of an ASIC, flip-flops in an FPGA, the random access memory of a computer system, a memory circuit contained in a logic circuit, etc. Further, controller 202 may alternatively or additionally be communicatively coupled with an external computer system. It should also be appreciated that controller 202 could readily be embodied in a general mobile machine controlling system capable of controlling numerous mobile machine functions.

Referring to FIG. 2, controller 202 may be in electrical communication with engine 102, generator 104, reverse recovery unit 108, inverter system 110, traction motor 112, one or more drive wheels 114, and the like. Controller 202 may also be in electrical communication with various other components of mobile machine 100, such as parasitic loads 116, auxiliary system 118, and the like. By way of such connections, controller 202 may receive data pertaining to the current operating parameters of regenerative braking system 200 and mobile machine 100 as input signals. The input signals may be provided by, for example, a plurality of sensors associated with each component. In response to such input, controller 202 may perform the necessary determinations and transmit any output signals corresponding to the actions that need to be performed. The output signals may be integrated commands that are transmitted to various actuators or electronic devices, such as transistors or actuators, which are associated with the relevant components.

Controller 202 may be configured to receive a retarding command from an input node 208 when traction motor 112 enters the regenerative braking mode. The retarding command provided at input node 208 may be generated in response to displacement of a manual control by the operator of mobile machine 100. Alternatively, controller 202 may be configured to generate the retarding command based on one or more operating parameters of mobile machine 100. For example, controller 202 may receive a rotation speed of a drive wheel 114 via a communication line from a speed sensor mounted near the drive wheel. Controller 202 may also receive a back electromotive force in traction motor 112 via a communication line from a voltage meter mounted in a stator winding of the motor. The combination of these operating parameters may indicate that the desired speed of mobile machine 100 is less than a current detected speed and that mobile machine 100 is to be decelerated.

Controller 202 may receive and interpret the retarding command according to a predetermined algorithm. The algorithm may determine a magnitude of the retarding being commanded, for example, in units of energy or power. Based on such data, controller 202 may determine the amount of electrical power to be regenerated and respond accordingly. This determination may be based on various machine operating parameters. The parameters may include the payload, the rate of acceleration, the desired speed, the rate of change of the command to retard mobile machine 100, and the like, which may be input to the controller 202 via one or more additional input nodes 210.

Controller 202 may control the flow of the regenerated electrical power according to the predetermined algorithm. Specifically, controller 202 may control reverse recovery unit 108 to communicate a predetermined amount of regenerated electrical power needed by generator 104 to keep the parasitic loads 116 and auxiliary system 118 running during the regenerative braking mode. Controller 202 may determine the amount of needed power based on various operating parameters collected from parasitic loads 116 and auxiliary system 118 via multiple communication lines. Alternatively, controller 202 may make this determination based on standard specifications of mobile machine 100. This way, the fuel consumption of engine 102 may be reduced during the regenerative braking mode. Moreover, controller 202 may control inverter system 110 to direct any excess regenerated electrical power to retarding grid 122 so that the excessive power may be dissipated as heat. Furthermore, in some embodiments, controller 202 may control inverter system 110 to direct at least part of the excessive regenerated electrical power to recharge energy storage device 120.

Reverse recovery unit 108 may include an inverter 204 and a filter 206. Inverter 204 may be electrically connected in parallel with rectifier 106. Inverter 204 may be operable to receive the DC power generated by inverter system 110 and convert the DC power to AC power outputted to generator 104. Inverter 204 may embody any inverter known in the art. That is, inverter 204 may embody any combination of power electronics, hardware, and/or software operable to convert DC power to AC power. For example, inverter 204 may include a three-phase inverter configured to generate three current signals to drive generator 104. Inverter 204 may be a pulse-width modulation (PWM) inverter. Further, inverter 204 may operate through the use of one or more semiconductor switches or similar devices to convert DC power to AC power. For example, inverter 204 may include any number of thyristors, insulated gate bipolar transistors (IGBTs), metal-oxide-semiconductor field-effect transistors (MOSFETs), bipolar junction transistors (BJTs), resistors, capacitors, inductors, diodes, etc., configured to operate according to the present disclosure. In some embodiments, inverter 204 may include a blocking diode electrically connected in series with the semiconductor switches to only allow electrical power flowing from the side of inverter system 110 to the side of generator 104. Accordingly, the blocking diode may ensure that inverter 204 only reversely communicates the regenerated power from traction motor 112 to generator 104.

For inverter 204, the use of a PWM technique in conjunction with fast switching devices such as IGBTs may generate fast-changing transient voltage that corresponds to high-order harmonics in the output waveform. Moreover, due to the parallel connection of rectifier 106 and inverter 204, the voltage outputted by inverter 204 may turn on the diodes in rectifier 106 and cause current circulation in inverter 204 and rectifier 106. Such current circulation may further reinforce the transient voltage so as to cause large harmonic distortions on the AC voltage outputted by inverter 204. The distortions may disturb or damage other sensitive electrical devices. The fast-changing transient voltage may also add significant electrical stress on the slow-responding diodes of rectifier 106. Thus, the transient voltage coupled with current circulation may deteriorate the system performance and cause power loss. To remove the transient voltage, the output of inverter 204 may be directed to pass filter 206. Filter 206 may be electrically connected downstream of inverter 204 and in parallel with rectifier 106. Filter 206 may be configured to reduce the amount of the transient voltage by filtering the high-frequency content of the AC output.

Figure 3B:
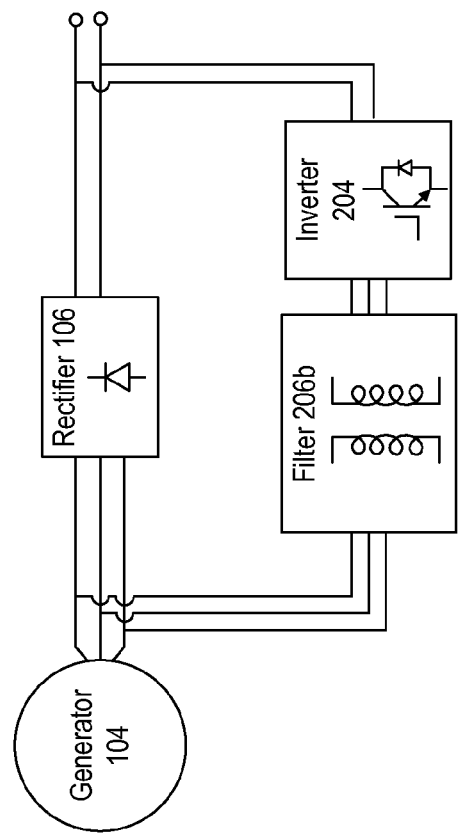
FIG. 3B is a schematic diagram illustrating another exemplary embodiment of a filter used in the regenerative braking system illustrated in FIG. 2.
Figure 3A:
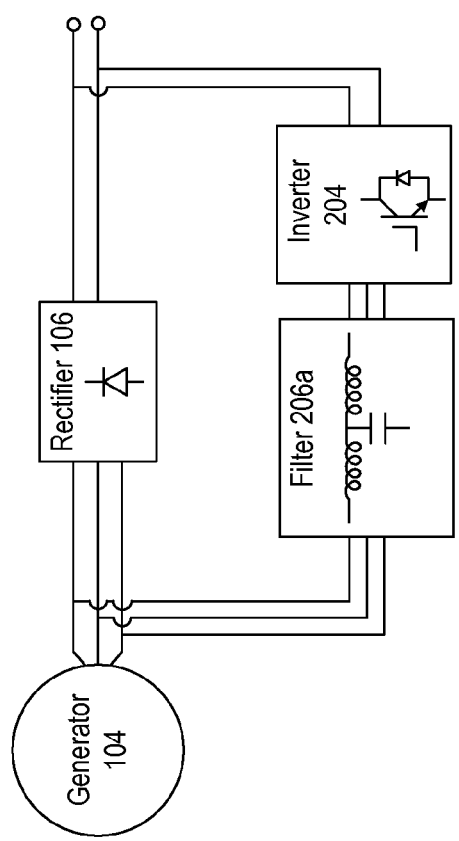
FIG. 3A is a schematic diagram illustrating an exemplary embodiment of a filter used in the regenerative braking system illustrated in FIG. 2.

FIGS. 3A and 3B schematically illustrate two exemplary embodiments of filter 206 respectively. Referring to FIG. 3A, filter 206a may include one or more inductor-capacitor-inductor (LCL) filters electrically connected downstream of inverter 204 and in parallel with rectifier 106. The LCL filters may serve to filter the high-frequency AC power so as to remove the fast-changing transient voltage. For example, filter 206a may include three LCL filters connected respectively to each of the three output terminals of inverter 204, so that transient voltage may be removed from each of the three phases of the output.

Referring to FIG. 3B, filter 206b may include one or more transformers electrically connected downstream of inverter 204 and in parallel with rectifier 106. The transformers may serve to filter the high-frequency AC power so as to remove the fast-changing transient voltage. For example, filter 206b may include three transformers connected respectively to each of the three output terminals of inverter 204, so that transient voltage may be removed from each of the three phases of the output. Moreover, the transformers may be configured to be step-down transformers. That is, the transformers may be configured to lower the amount of AC voltage outputted by inverter 204 by a predetermined factor. Such reduction may reduce the chance of inducing the current circulation.

In some embodiments, slow-responding semiconductor switches may be used in inverter 204 to reduce the production of transient voltage. For example, inverter 204 may include one or more silicon-controlled rectifiers (SCRs), with a typical switching frequency in the order of milliseconds.

INDUSTRIAL APPLICABILITY

Figure 4:
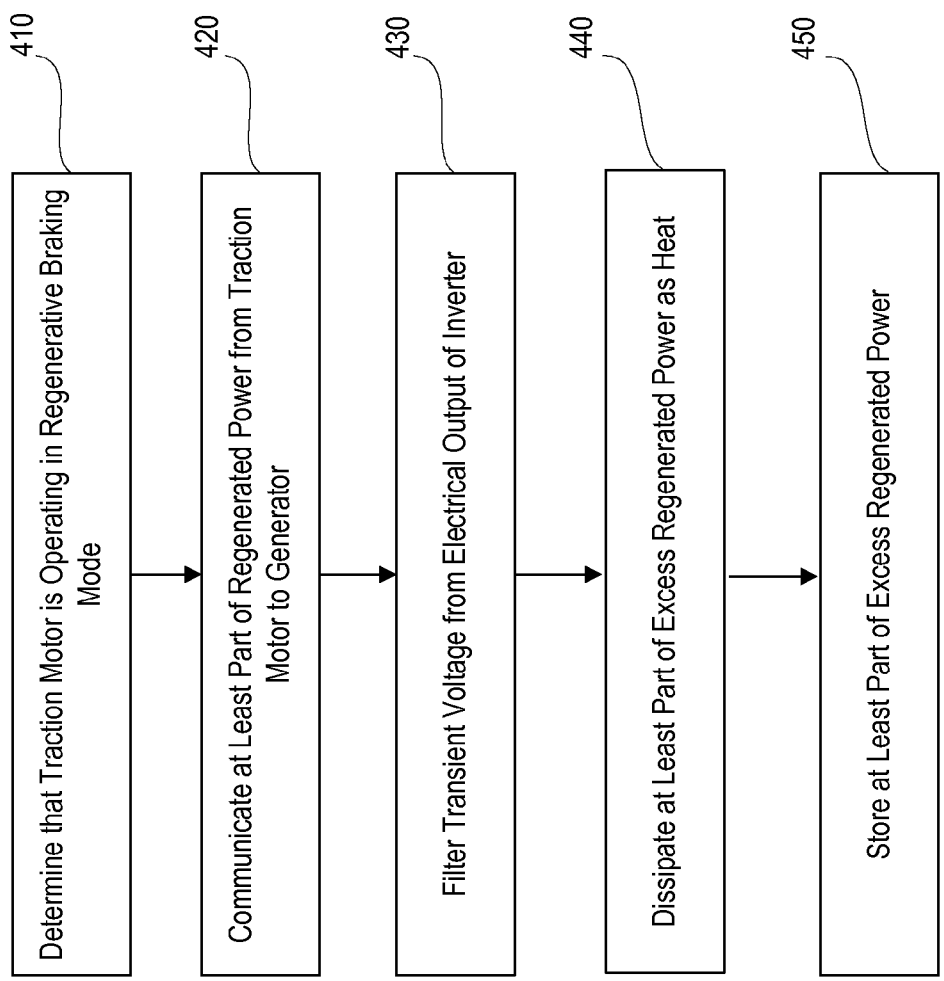
FIG. 4 is a flow chart illustrating a method of using the regenerative braking system illustrated in FIG. 2, according to an exemplary embodiment.

The disclosed regenerative braking system 200 uses an inverter and a filter to construct an electrical pathway for supplying regenerated electrical power to a generator. This way, regenerative braking system 200 may reliably reduce fuel consumption during regenerative braking. System 200 may be feasibly integrated into various machines and/or electric drive systems. Accordingly, a method of using the regenerated electrical power consistent with the implementation of regenerative braking system 200 will now be explained with reference to FIG. 4.

In step 410, controller 202 determines that traction motor 112 is operating in the regenerative braking mode based on one or more input signals. Controller 202 may receive from input node 208 a retarding command generated in response to displacement of a manual control by the operator of mobile machine 100. Alternatively, controllers 202 may make this determination based on one or more operating parameters of mobile machine 100. These operation parameters may be transmitted to controller 202 by one or more sensors via one or more communication lines. For example, controller 202 may receive a rotation speed of a drive wheel 114 via a communication line from a speed sensor mounted near the drive wheel and determines that the drive wheel is decelerating.

In step 420, inverter 204 communicates at least part of the regenerated power from traction motor 112 to the generator 104. Controller 202 may determine the amount of the regenerated power needed by generator 104 to keep parasitic loads 116 and auxiliary system 118 operating during the regenerative braking mode. Controller 202 may then command inverter 204 to communicate the determined amount of regenerated power from traction motor 112 to generator 104.

In step 430, filter 206 filters transient voltage from the electrical output of inverter 204. For example, filter 204 may include one or more LCL filters electrically connected downstream of inverter 204 and in parallel with rectifier 106. For another example, filter 204 may include one or more transformers electrically connected downstream of inverter 204 and in parallel with rectifier 106.

In step 440, retarding grid 122 may dissipate at least part of the excess regenerated power as heat. If controller 202 determines that the regenerated power produced by traction motor 112 exceeds the power received by inverter 204, controller 202 may command inverter system 110 to direct at least part of the excess regenerated power to retarding grid 112 to be dissipated.

In step 450, energy storage device 120 may store at least part of the excess regenerated power. If controller 202 determines that the regenerated power produced by traction motor 112 exceeds the power received by inverter 204, controller 202 may command inverter system 110 to direct at least part of the excess regenerated power to be stored in energy storage device 120 for future use.

System 200 provides a two-stage power communicating solution for mobile machine 100. In addition to a first electrical pathway established by rectifier 106 to output the power generated by engine 102, a second electrical pathway is established by inverter 204 and filter 206 to supply the regenerated power to generator 104. While rectifier 106 may be configured to handle the entire traction power needed by mobile machine 100, for example, in the order of megawatts, inverter 204 and filter 206 may be configured to handle the much smaller regenerated power needed by generator 104 during the regenerative braking mode, for example, in the order of kilowatts.

Several advantages over the prior art may be associated with the disclosed regenerative braking system 200. The system 200 may reliably supply the regenerated power to generator 104 so as to allow mobile machine 100 to reduce fuel consumption during the regenerative braking mode. Additionally, system 200 uses small and inexpensive devices, such as inverter 204 and filter 206, to establish the second electrical pathway. These devices do not introduce significant weight to mobile machine 100.

It will be apparent to those skilled in the art that various modifications and variations can be made to the disclosed regenerated braking system 200. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A regenerative braking system, comprising:
   an engine;
   a generator configured to be driven by the engine to produce AC electrical power;
   a rectifier configured to receive AC electrical power from the generator and convert the AC power to DC power;
   a first inverter configured to receive the DC power and convert the DC power to AC power;
   a traction motor configured to be driven by the AC power in a traction mode, and to produce regenerated power when rotated in reverse in a regenerative braking mode; and
   a reverse recovery unit including:
      a second inverter electrically connected in parallel with the rectifier, the inverter being configured to communicate at least part of the regenerated power from the traction motor to the generator during the regenerative braking mode; and
      a filter electrically connected downstream of the second inverter and in parallel with the rectifier, the filter being configured to filter transient voltage generated by the second inverter during the regenerative braking mode.

2. The system of claim 1, wherein the filter comprises one or more LCL filters.

3. The system of claim 1, wherein the filter comprises one or more transformers.

4. The machine of claim 1, wherein the second inverter comprises:
   one or more semiconductor switches; and
   a blocking diode electrically connected in series with the one or more semiconductor switches, the blocking diode being configured to prevent the second inverter from communicating power from the generator to the traction motor.

5. The system of claim 1, wherein the second inverter comprises one or more silicon-controlled rectifiers.

6. The system of claim 1, further comprising a controller communicatively connected to the reverse recovery unit, wherein the controller is configured to:
   determine that the traction motor is operating in the regenerative braking mode based on one or more input signals; and
   command the reverse recovery unit to communicate at least part of the regenerated power from the traction motor to the generator.

7. The system of claim 1, further comprising a retarding grid including one or more resistors, wherein the retarding grid is configured to dissipate at least part of the regenerated power.

8. The system of claim 1, further comprising an energy storage device configured to store at least part of the regenerated power.

9. A method for reducing fuel consumption of a machine during regenerative braking, wherein the machine includes a generator, a rectifier, and a traction motor configured to produce regenerated power in a regenerative braking mode, the method comprising:
   directing at least part of the regenerated power from the traction motor to the generator through an inverter during the regenerative braking mode, the inverter being electrically connected in parallel with the rectifier; and
   directing electrical output of the inverter through a filter to remove transient voltage from the electrical output, the filter being electrically connected downstream of the inverter and in parallel with the rectifier.

10. The method of claim 9, wherein the filter comprises one or more inductor-capacitor-inductor filters.

11. The method of claim 9, wherein the filter comprises one or more transformers.

12. The method of claim 9, wherein the inverter comprises:
   one or more semiconductor switches; and
   a blocking diode electrically connected in series with the one or more semiconductor switches, the blocking diode being configured to prevent the inverter from communicating power from the generator to the traction motor.

13. The method of claim 9, wherein the inverter comprises one or more silicon-controlled rectifiers.

14. The method of claim 9, further comprising:
   determining the traction motor is operating in the regenerative braking mode based on one or more input signals.

15. The method of claim 9, further comprising:
   determining that the regenerated power produced by the traction motor exceeds the power received by the inverter; and
   dissipating at least part of the excess regenerated power through a retarding grid including one or more resistors.

16. The method of claim 9, further comprising:
   determining that the regenerated power produced by the traction motor exceeds the power received by the inverter; and
   storing at least part of the excess regenerated power in an energy storage device.

17. A reverse recovery unit for a machine including a generator, a rectifier, and a traction motor configured to produce regenerated power in a regenerative braking mode, wherein the reverse recovery unit is used to communicate the regenerated power from the traction motor to the generator, the unit comprising:
   an inverter electrically connected in parallel with the rectifier, the inverter being configured to communicate the regenerated power from the traction motor to the generator during the regenerative braking mode; and
   a filter electrically connected downstream of the inverter and in parallel with the rectifier, the filter being configured to filter transient voltage generated by the inverter during the regenerative braking mode.

18. The unit of claim 17, wherein the filter comprises one or more inductor-capacitor-inductor filters.

19. The unit of claim 17, wherein the filter comprises one or more transformers.

20. The unit of claim 17, wherein the inverter comprises one or more silicon-controlled rectifiers.

* * * * *